Feb. 16, 1960 H. S. RAINBOW 2,924,934
MEANS FOR VARYING THE EFFECTIVE CROSS-SECTIONAL
AREA OF ONE PART OF A FLUID FLOW DUCT
Filed Sept. 3, 1954

United States Patent Office 2,924,934
Patented Feb. 16, 1960

2,924,934

MEANS FOR VARYING THE EFFECTIVE CROSS-SECTIONAL AREA OF ONE PART OF A FLUID FLOW DUCT

Horace S. Rainbow, Coventry, England, assignor to Armstrong Siddeley Motors Limited, Coventry, England Application September 3, 1954, Serial No. 454,055

Claims priority, application Great Britain September 17, 1953

4 Claims. (Cl. 60—35.6)

This invention relates to a device for varying the effective cross-sectional area of one part of a fluid flow duct of circular cross-section—for example, the air intake of a gas turbine engine, or, more particularly, the jet nozzle thereof in the case of a jet engine.

The main object of the invention is to provide such a device which is relatively simple and which requires relatively light actuating loads, but various other advantages of the invention are pointed out hereinafter.

According to the invention, the said device includes a number of overlapping throat segments extending round the periphery of the wall of the duct at the requisite place and pivotally mounted outside the wall for movement about co-planar axes the pitch circle of which is in a plane at right-angles to the axis of the duct, each of the segments, movable inwardly to reduce the effective area of the duct, being arcuate at any true radial cross-section about the pitch circle of its pivotal axis.

The pivotal mounting of the segments is preferably effected downstream of a fixed throat member constituting the wall of the duct at the requisite place.

In the accompanying drawings:

Figure 1 is a fragmentary sectional elevation, taken mainly on the line 1—1 of Figure 2, showing a portion of a fixed throat member as aforesaid and one of the throat segments, along with the actuating means, the throat segments being, however, shown in the withdrawn position. Figure 1 also shows the throat member in chain lines when moved to its fullest extent to reduce the effective area of the duct.

Figure 1:
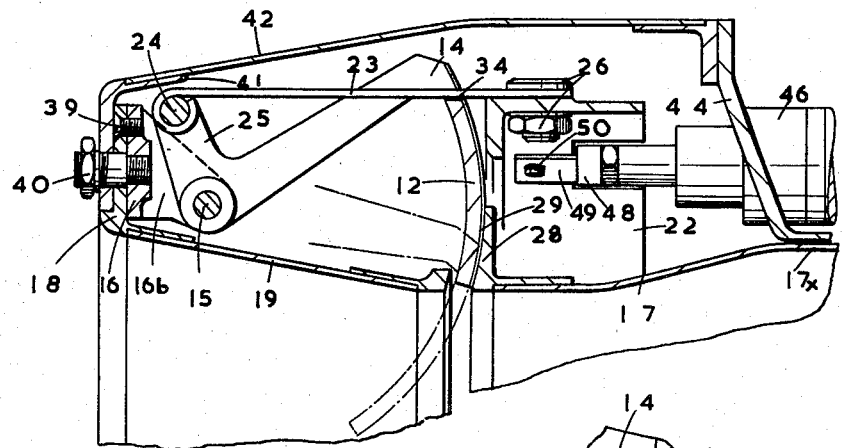
Figure 2:
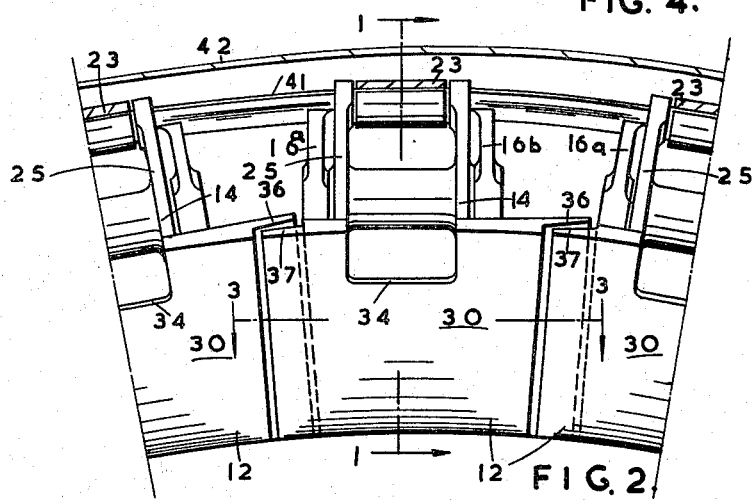
Figure 2 is an axial fragmentary view, looking from the right of Figure 1, mainly of the throat segments when moved fully to reduce the effective area of the duct.
Figure 3:
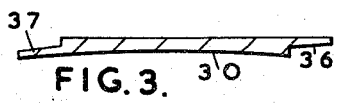
Figure 3 is a cross-section taken on the line 3—3 of Figure 2.

In the construction of Figures 1 to 3, as applied to the jet nozzle of a gas turbine engine, there are, for example, thirty-six such segments 12. These may be formed as castings of a heat resistant alloy, each being integrally connected at its radially outer end with similar arms 14, 14 of a pair of spaced bell crank levers. The latter are pivotally mounted at 15 in a bracket 16 downstream of a fixed throat member 17 at the downstream end (i.e., the left-hand end in Figure 1) of the jet pipe 17x, the bracket being secured to an outwardly-extending flange 18 carried at the downstream extremity of a divergent extension 19 from the fixed throat member.

The axes of the pivots 15 of the bell-crank levers 14, 25 are tangential to a pitch circle concentric with the duct 17, 19, and the curvature of the segments 12 is such that the segments conform, in any true radial plane through the axis of the duct, to a circular arc having at its centre the point at which the radial plane intersects the pitch circle. In other words, the segments 12 are arcuate, at any true radial cross-section, about the pitch circle.

Preferably, and as shown, each bracket 16 comprises a pair of spaced ears 16a, 16b between which the arms 14 of the bell crank levers are mounted.

Upstream of the segments 12 and levers, and outside the wall of the fixed throat member 17, is arranged an axially-movable actuating ring 22 which is rigidly attached to connecting links 23 pivoted at their other ends 24 to and between the other arms 25 of each pair of bell crank levers, these other arms being relatively short ones. Each connecting link 23 preferably takes the form, as shown, of a spring blade secured to the actuating ring 22 by means of a radially-extending bolt or the like 26. By using spring blades which are initially slightly preloaded, each segment and the associated parts are damped against free movement arising from the working clearances in the pivotal connections.

At the downstream end of the fixed throat member 17, i.e., just upstream of the segments, is arranged an outwardly-extending, generally radial flange 28 the operative face 29 of which is concave (in sectional elevation) to coact with the convex face of each segment and which may have circumferential ridges (not shown) on this concave face to reduce gas leakage. The convex faces 30 (seen in Figure 2 and Figure 3) of the segments are also shaped to coact with the flange 28 to maintain a given clearance between the faces of the flange and segments in order to establish an effective gas seal during the full range of operation of the segments.

Figure 4:
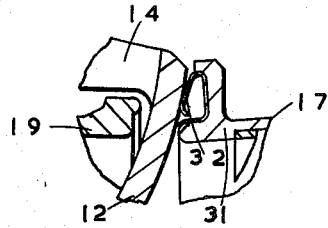
Figure 4 is a fragmentary view, similar to that of Figure 1 (but showing the throat segment in position fully to reduce the effective area of the duct), of a modification.

In the modification of Figure 4, in which 17 represents the fixed throat member, 12 one of the throat segments, and 19 the said divergent extension, the flange 28 is replaced by a flange 31 carrying on its operative face a spring ring 32 to coact with the convex faces 30 of the segments 12.

Each segment, between the adjacent ends of the two long arms 14, 14 of the integral bell crank levers, is recessed, as shown at 34, to receive the associated connecting link 23 when the segment is withdrawn.

Reference has been made above to the segments overlapping one another. Each segment has along one lateral side a rebate or recess 36 to receive a laterally-extending tongue 37 of the adjacent segment. When the segments are extended (Figure 2) to reduce the nozzle area to the fullest extent, the lateral tongues 37 will substantially fully occupy the coacting recesses 36, but as the segments are retracted the overlapping of the adjacent tongues and recesses will decrease, though, for sealing purposes, there will always be an overlap.

The parts as thus described can be assembled as a unit before fitting to the fixed throat member 17, the brackets 16 with the bell crank levers pivotally-mounted thereon being secured to the flange 18 by screws, of which one screw 39 appears in Figure 1, each bracket and this flange having aligned holes subsequently to receive an axially-extending bolting means 40 through an inturned flange 41 at the downstream end of an external casing 42 enclosing the segments and associated parts. Upstream of the parts the external casing 42 is connected to a radial flange 44 supported from the fixed throat member. This radial flange 44 serves for the rigid support of three or more angularly-spaced actuators which are connected to the actuating ring and which may, of course, be hydraulically or otherwise operated. (Only one of these actuators, 46, appears in Figure 1.) The connection of each actuator 46 preferably includes a forked movable element 48 the prongs 49 of which embrace with clearance the radial internal and external faces of the actuating ring 22 and are bolted thereto, as indicated at 50, so as to allow for expansion in operating conditions.

By constructing a variable nozzle as described, the movable segments 12 are substantially balanced by the gas pressure throughout the full range of operation. Consequently, only relatively light actuating forces are necessary to overcome any small degree of unbalance in the system, the frictional resistance of the pivots arising from the gas loading, and the gas friction on the working faces of the segments.

The whole assembly can, therefore, be made much lighter in weight than one in which the static pressure of the gas flow is not substantially balanced.

It will also be seen that by connecting the actuating ring 22 with the segments by means of the spring blades 23 in the manner described, the actuating ring is supported thereby in concentric relationship, the spring blades can flex during actuation of the associated segments to accommodate the arcuate movement of their pivotal connections with the arms of the bell crank levers, and they also permit a degree of freedom to accommodate radial expansion of parts of the assembly. There is a minimum leakage owing to efficient sealing. In the case of a circular duct the segments provide a substantially circular opening in all positions.

It should also be noted that the actuating mechanism is remote from the direct heat of the gas stream, this being particularly important when reheating is employed.

Furthermore, the relatively small movable segments 12, each independently mounted and arranged as described, are well adapted to accommodate distortion should this arise from uneven heating.

What I claim as my invention and desire to secure by Letters Patent of the United States is:

1. A device for varying the effective cross-sectional area of one part of a fluid flow duct of circular section, said duct having a circular wall at the requisite place, including a large number of throat segments overlapping throughout their lengths and extending around the periphery of the wall, and pivotally mounted outside the wall for movement about co-planar axes which are tangential to a pitch circle which is in a plane at right angles to the axis of the duct, the co-planar axes themselves being transverse to the axis of the duct, each of the segments, movable inwardly to reduce the effective area of the duct, conforming in any true radial plane to a circular arc having as its centre the point at which said radial plane intersects said pitch circle whereby the segments are substantially balanced by gas pressure throughout their range of operation.

2. A device for varying the effective cross-sectional area of a fluid flow duct having a fixed throat member of circular cross-section, including a circle of generally radially extending throat segments overlapping along the whole of their radial edges and extending around the periphery of the throat member at the downstream end thereof, means external to the throat member pivotally supporting each segment downstream of said throat member to allow movement of the segments bodily and radially inwardly to reduce the effective area of the throat member, said means comprising a bell crank lever formed integrally with each segment, a ring for actuating all said bell crank levers in unison, spring blades connecting each bell crank lever to the ring, and actuators spaced circumferentially around said throat member for actuating said ring, the bell crank levers being pivoted at positions spaced apart circumferentially in a pitch circle and each segment conforming in any true radial plane to a circular arc having as its centre the point at which said radial plane intersects said pitch circle.

3. A device for varying the effective cross-sectional area of a fluid flow duct having a fixed circular throat member, including a large number, for example 36, of generally radial overlapping segments extending around the periphery of the throat member at the downstream end thereof, means pivotally supporting each segment downstream of the throat member to allow movement of the segments bodily inwardly in a generally radial direction to reduce the effective area of said throat member, the segments in their inoperative position lying entirely outside the throat member, a flange extending outwardly from said throat member near its upstream end, a plurality of axially-arranged actuators spaced externally and circumferentially around said throat member and carried by said flange, an axially-movable ring connected to actuate all of the segments in unison, and means interconnecting the actuators and said ring including forked elements which straddle said ring with clearance, said pivoting means for the segments being spaced apart circumferentially in a pitch circle and each segment conforming in any true radial plane to a circular arc having as its centre the point at which said radial plane intersects said pitch circle.

4. A device according to claim 1, and including an annular casing, and a plurality of bell crank levers pivotally supported in and by said annular casing, each of said bell crank levers carrying one of said segments, the casing being adapted to be fitted to the end of and to form a continuation of said duct, whereby in their inoperative position the segments do not extend into the gases flowing in the duct but are entirely contained in said casing.

References Cited in the file of this patent

UNITED STATES PATENTS

| 2,488,174 | Clegern | Nov. 15, 1949 |
| 2,551,372 | Haltenberger | May 1, 1951 |
| 2,570,847 | Ovens | Oct. 9, 1951 |
| 2,620,622 | Lundberg | Dec. 9, 1952 |
| 2,625,008 | Crook | Jan. 13, 1953 |
| 2,649,272 | Barbato | Aug. 18, 1953 |
| 2,682,147 | Ferris | June 29, 1954 |
| 2,693,078 | Laucher | Nov. 2, 1954 |
| 2,770,944 | Jordan | Nov. 20, 1956 |
| 2,791,882 | Willard | May 14, 1957 |

FOREIGN PATENTS

| 56,672 | France | July 23, 1952 |
| | (Addition to No. 943,820) | |
| 162,381 | Switzerland | Sept. 1, 1933 |